United States Patent
Warpinski et al.

(10) Patent No.: US 10,620,328 B2
(45) Date of Patent: Apr. 14, 2020

(54) STACKED RECEIVERS FOR MICROSEISMIC MONITORING

(75) Inventors: Norm Warpinski, Cypress, TX (US); Julie Shemeta, Highlands Ranch, CO (US); Shawn Maxwell, Calgary (CA); Craig Funk, Calgary (CA)

(73) Assignee: Halliburton Energy Services, Inc., Houston, TX (US)

( * ) Notice: Subject to any disclaimer, the term of this patent is extended or adjusted under 35 U.S.C. 154(b) by 943 days.

(21) Appl. No.: 11/752,765

(22) Filed: May 23, 2007

(65) Prior Publication Data

US 2008/0291782 A1    Nov. 27, 2008

(51) Int. Cl.
*G01V 3/00* (2006.01)
*G01V 1/18* (2006.01)
*G01V 1/52* (2006.01)

(52) U.S. Cl.
CPC ............... *G01V 1/181* (2013.01); *G01V 1/52* (2013.01); *G01V 2210/123* (2013.01)

(58) Field of Classification Search
CPC ...................................................... G01V 1/16
USPC ...... 340/853.1, 854.3, 854.6, 854.7; 367/76; 702/14
See application file for complete search history.

(56) References Cited

U.S. PATENT DOCUMENTS

| | | | |
|---|---|---|---|
| 5,886,303 A * | 3/1999 | Rodney | 181/102 |
| 6,188,645 B1 | 2/2001 | Maida, Jr. et al. | |
| 6,332,109 B1 | 12/2001 | Sheard et al. | |
| 2003/0195705 A1 * | 10/2003 | Leaney | 702/14 |
| 2006/0062082 A1 * | 3/2006 | Mandal | 367/25 |
| 2006/0217890 A1 * | 9/2006 | Iranpour et al. | 702/14 |
| 2006/0221768 A1 * | 10/2006 | Hall et al. | 367/82 |
| 2007/0107938 A1 * | 5/2007 | Cornish | E21B 47/12 175/50 |
| 2007/0183259 A1 * | 8/2007 | Yogeswaren et al. | 367/25 |

OTHER PUBLICATIONS

'Analog-to-Digital Converter: Section: "Aliasing" and Section: "Oversampling" ' 2005, Wikipedia.*
"Canadian Application Serial No. 2,631,307, Office Action dated Sep. 24, 2012", 3 pgs.
"Canadian Application Serial No. 2,631,307, Response filed Oct. 31, 2012 to Office Action dated Sep. 24, 2012", 6 pgs.
"Canadian Application Serial No. 2,631,307, Office Action dated Apr. 3, 2013", 3 pgs.

* cited by examiner

*Primary Examiner* — Amine Benlagsir
(74) *Attorney, Agent, or Firm* — Chamberlain Hrdlicka

(57) ABSTRACT

An apparatus comprising a stacked node configured to be positioned within a subterranean opening and comprising a plurality of separate receivers oriented end-to-end and each configured to independently detect subterranean activity, and a transmission medium configured to transmit data from the stacked node, wherein the data is representative of subterranean activity detected by the plurality of separate receivers.

14 Claims, 2 Drawing Sheets

STACKED RECEIVERS FOR MICROSEISMIC MONITORING

BACKGROUND OF THE DISCLOSURE

Microseismic monitoring and borehole geophysics relies on detecting very small "events" from remote sources with receivers located in a borehole. To attain accuracy, however, it is necessary that the signals be sufficiently greater in amplitude than noise levels. This limits the ability to detect small and/or far remote events which attenuate during travel through rock and other formations.

Stacking of geophones or other sensors within a receiver is a common procedure for improving the signal-to-noise ratio (SNR) of a recorded seismic event. However, while the stacking of many sensors in a single tool may be useful in summing signals so that overall levels are large enough for accurate digitization, such stacking of sensors does little for noise cancellation because all sensors detect the same cultural noise. In addition, all of the data collected by sensors in the same receiver will reflect the same electronic noise when amplified and digitized. When stacking receivers, the only noise that might cancel when two events are summed together is noise that is self-generated within the sensor. However, self-generated noise within the sensor is usually very small.

DETAILED DESCRIPTION

Figure 1:
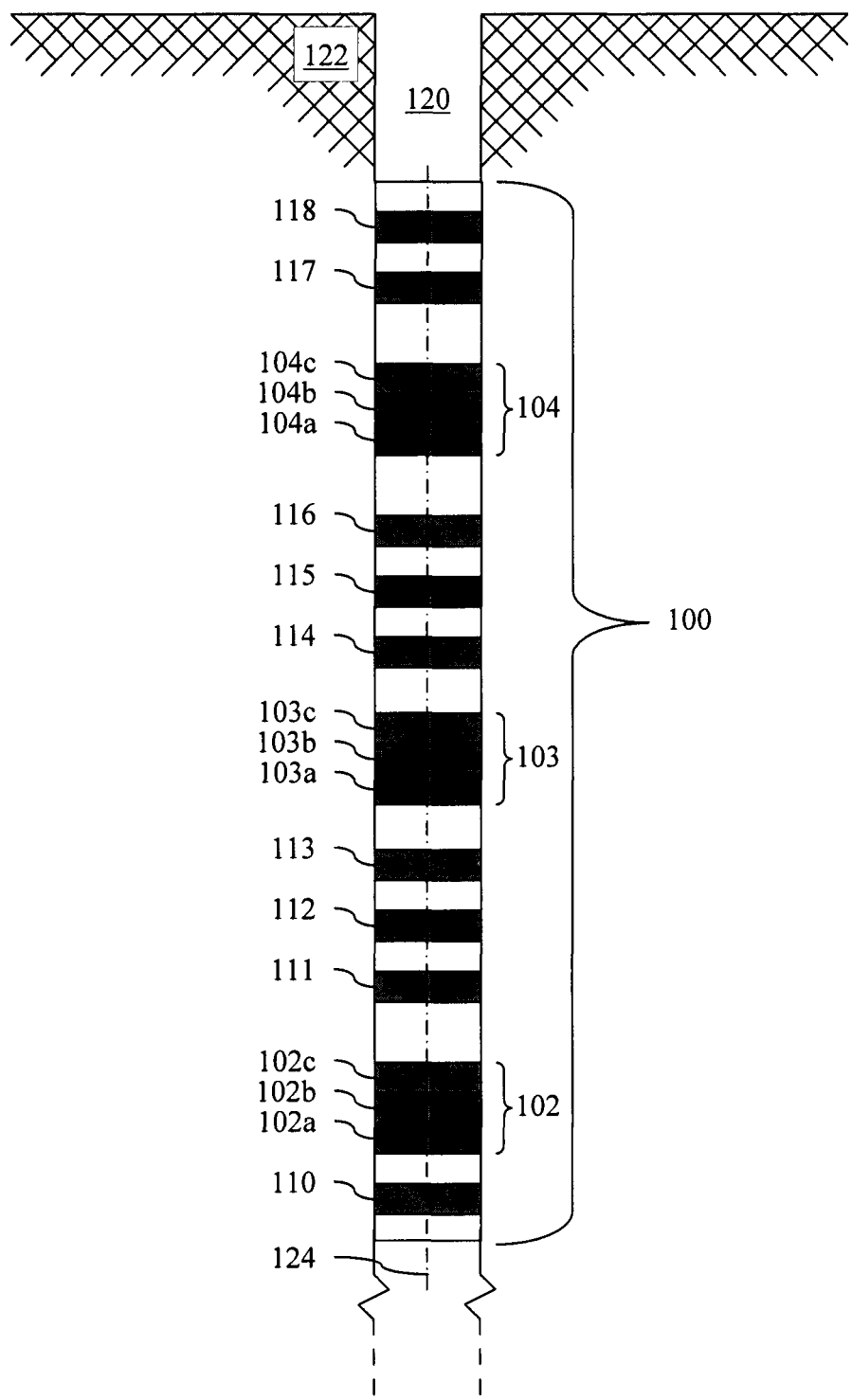
FIG. 1 a schematic side view of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring to FIG. 1, illustrated is a schematic side view of at least a portion of an exemplary embodiment of a stacked receiver array 100 according to one or more aspects of the present disclosure. The stacked receiver array 100 comprises a plurality of stacked nodes 102-104 and a plurality of unstacked nodes 110-118. The stacked receiver array 100 is situated within a wellbore or other opening 120 formed in a geologic formation 122. The stacked nodes 102-104 and the unstacked nodes 110-118 may be axially aligned along a vertical axis 124, as illustrated in FIG. 1. However, other orientations of the stacked nodes 102-104 and the unstacked nodes 110-118 are also within the scope of the present disclosure. For example, the stacked nodes 102-104 and the unstacked nodes 110-118 may be aligned along a horizontal axis, and possibly keyed so that the sensors of all tools/receivers of one or more of the nodes are rotationally aligned. A first plurality of the stacked nodes 102-104 and a first plurality of the unstacked nodes 110-118 may also be axially aligned along a vertical axis while a second plurality of stacked nodes and a second plurality of unstacked nodes may be axially aligned along a horizontal axis.

Each of the stacked nodes 102-104 comprises a plurality of separate receivers 102a-c, 103a-c, 104a-c, respectively. Each separate receiver 102a-c, 103a-c, 104a-c of a stacked node 102-104 may be substantially similar to other separate receivers 102a-c, 103a-c, 104a-c in the same stacked node 102-104. However, each separate receiver 102a-c, 103a-c, 104a-c of a stacked node 102-104 may also be different from other separate receivers 102a-c, 103a-c, 104a-c of the same stacked node 102-104. Also, although each of the stacked nodes 102-104 comprises three separate receivers 102a-c, 103a-c, 104a-c, one or more of the stacked nodes 102-104 may have a different number of separate receivers.

Each of the separate receivers 102a-c, 103a-c, 104a-c may be attached end-to-end or side-to-side such that each separate receiver 102a-c, 103a-c, 104a-c is adjacent to at least one other separate receiver 102a-c, 103a-c, 104a-c of the same stacked node 102-104. As illustrated in FIG. 1, the separate receivers 102a-c are positioned adjacent to each other to form the first stacked node 102, the separate receivers 103a-c are positioned adjacent to each other to form the second stacked node 103, and the separate receivers 104a-c are positioned adjacent to each other to form the third stacked node 104. The separate receivers 102a-c, 103a-c, 104a-c may be mechanically and/or electrically coupled to an adjacent separate receiver 102a-c, 103a-c, 104a-c of the same stacked node 102-104, or may be axially spaced apart from an adjacent separate receiver 102a-c, 103a-c, 104a-c of the same stacked node 102-104 by a short interconnect. Such interconnect may comprise one or more wires comprising copper and/or other conductive materials, and/or fiber optic cabling. In embodiments in which the separate receivers 102a-c, 103a-c, 104a-c of a stacked node 102-104 are axially spaced apart, such spacing may range between about one inch and about 6 inches, although other distances are also within the scope of the present disclosure. Moreover, the distance between stacked and unstacked nodes may range between about ten feet and about 100 feet, although other distances are also within the scope of the present disclosure. Nonetheless, a stacked node may be identified by the existence of more than one receiver within a ten foot span of the wellbore 120, whereas an unstacked node may be separated from neighboring nodes by at least ten feet.

In an exemplary embodiment illustrated in FIG. 1, the unstacked node 110 is positioned below the stacked node 102, the unstacked nodes 111-113 are positioned between the stacked node 102 and the stacked node 103, the unstacked nodes 114-116 are positioned between the stacked node 103 and the stacked node 104, and the unstacked nodes 117-118 are positioned above the stacked node 104. The stacked receiver array 100 may have any number of stacked nodes 102-104 and unstacked nodes 110-118, and other arrangements of stacked nodes 102-104 and unstacked nodes 110-118 are also within the scope of the present disclosure.

Figure 2:
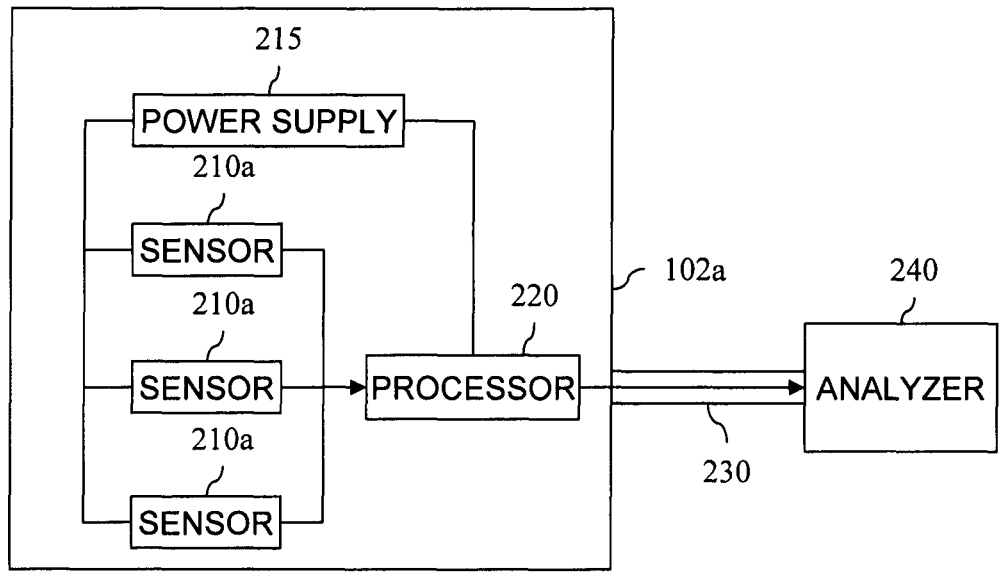
FIG. 2 is a schematic view of apparatus according to one or more aspects of the present disclosure.

Referring to FIG. 2 with continued reference to FIG. 1, illustrated is at least a portion of the separate receiver 102a shown in FIG. 1, which may be substantially similar or identical to the separate receivers 102*b*, 102*c*, 103*a-c*, 104*a-c* shown in FIG. 1. The separate receiver 102*a* comprises one or more sensors 210*a-c* each configured to independently collect data. In an exemplary embodiment, one or more of the sensors 210*a-c* collect seismic data. The separate receiver 102*a* may further comprise one or more processors 220 configured to provide certain processing tasks, such as converting analog data to digital data. Each processor 220 may convert analog data from more than one sensor 210*a-c*, as illustrated in FIG. 2, or each sensor 210*a-c* may have its own processor 220 that digitizes only data collected by that specific sensor 210*a-c*. The separate receiver 102*a* may further comprise a power source 215 configured to provide power to the sensors 210*a-c* and/or each processor 220. The sensors 210*a-c* and the processor 220 of the separate receiver 102*a* may also be powered by a power source that is external to the separate receiver 102*a* (not shown).

Each separate receiver 102*a* may be communicably coupled to a transmission medium 230 configured to transmit digitized data. For example, the transmission medium 230 may be or comprise one or more fiber optic cables communicable between a stacked node 102-104 and a destination. The transmission medium 230 may also be a plurality of fiber optic cables each configured to transmit data from a corresponding one of a plurality of separate receivers 102*a-c*, 103*a-c*, 104*a-c* of a stacked node 102-104 to another one of a plurality of separate receivers 102*a-c*, 103*a-c*, 104*a-c*. Other transmission mediums, such as a wireless transmission medium and transmission on copper conductors, are also within the scope of the present disclosure.

The destination of the digitized data transmitted via the transmission medium 230 may be an analyzer 240, or it may be other separate receivers 102*a-c*, 103*a-c*, 104*a-c* within the stacked receiver array 100. An analyzer 240 may be a computer configured to analyze digital data received from the receivers. Other embodiments of an analyzer 240, such as a person equipped to analyze digital data, are also within the scope of the present disclosure. The analyzer 240 may be positioned below or above the surface of the subterranean opening 120.

A stacked node comprising a plurality of stacked separate receivers 102*a-c*, 103*a-c*, 104*a-c* is unconventional because, for example, the number of receivers that may be used in a microseismic monitoring system can be limited by the telemetry rate. That is, it is known that the telemetry rate required for a given implementation increases proportionally as the number of receivers increases. Consequently, it has previously been counter-intuitive to stack separate receivers within a single stacked node according to aspects of the present disclosure.

For example, conventionally constrained telemetry rates can limit the number of separate receivers that can be used at any one time within a single microseismic monitoring system. Accordingly, the conventional strategy for positioning the receivers within a borehole or other opening is to spread the receivers along the length of the borehole, in attempt to thereby achieve maximum coverage of the desired length of the borehole. With a limited number of receivers, however, it is not feasible to stack receivers using conventional telemetry systems, because there would then be insufficient receivers spread along the borehole.

A fiber-optic wireline system according to one or more aspects of the present disclosure provides the ability to stack multiple receivers within a single node. Stacking separate receivers, which can enable the summation of signals from stacked and unstacked nodes and/or cancellation of noise present in the data, may result in an improvement in the signal-to-noise ratio of the data. For example, Applicants have obtained unexpected results from experimental implementations which utilize a three-receiver stacked node, relative to a single unstacked node. Such unexpected results demonstrate that utilizing a multi-receiver stacked node can provide a reduction in the signal-to-noise ratio by a factor of two, if not more.

Figure 3:
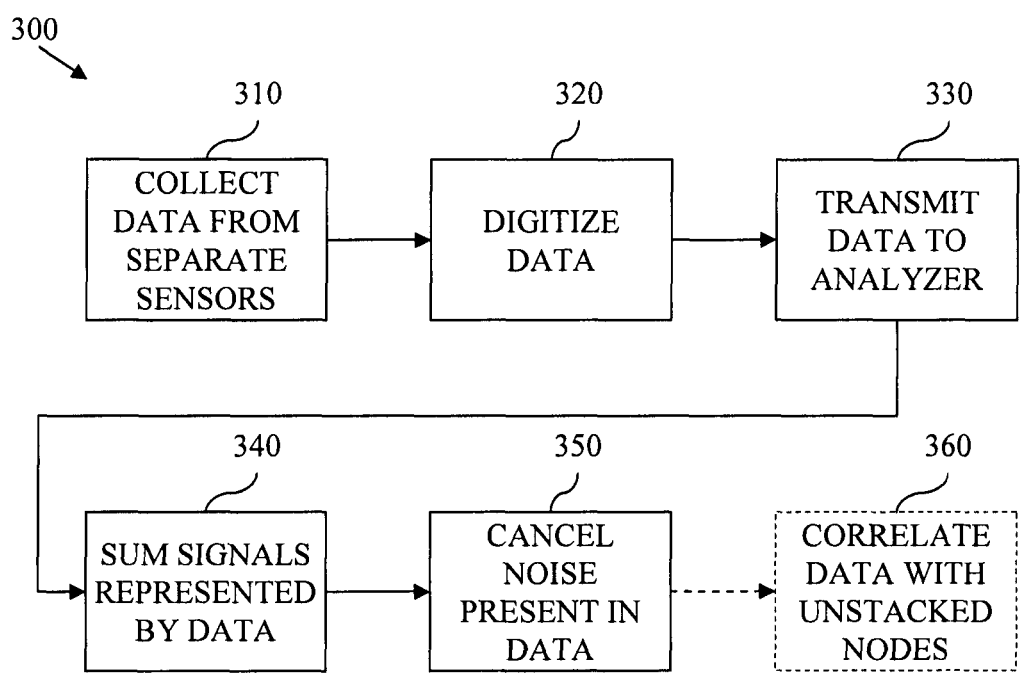
FIG. 3 is a flow-chart diagram of a method according to one or more aspects of the present disclosure.

Referring now to FIG. 3 with continued reference to FIGS. 1 and 2, illustrated is a flow-chart diagram of at least a portion of a method 300 of using stacked receivers 102-104 for monitoring subterranean activity according to aspects of the present disclosure. The method 300 includes a step 310 wherein one or more sensors 210*a-c* of each separate receiver 102*a-c*, 103*a-c*, 104*a-c* are employed to independently collect data representing subterranean activity, such as seismic activity. Other subterranean activity, such as telecommunications and electromagnetic activity are also within the scope of the present disclosure.

In a step 320, one or more processors 220 of the separate receivers 102*a-c*, 103*a-c*, 104*a-c* of a stacked node 102-104 are employed to convert the data collected in step 310 from analog data to digital data. Alternatively, each sensor 210*a-c* may have a processor 220 configured to independently convert each corresponding sensor's 210*a-c* collected data from analog data to digital data. In yet another exemplary embodiment, a processor 220 external to each separate receiver 102*a-c*, 103*a-c*, 104*a-c* may convert the data collected by a plurality of the separate receivers 102*a-c*, 103*a-c*, 104*a-c* of a stacked node 102-104. For example, in one embodiment, a processor 220 may be part of an analyzer 240. In such an embodiment, each sensor 210*a-c* may send analog data to the analyzer 240, so that the processor 220 may convert the analog data to digital data prior to further processing by the analyzer 240.

In a step 330, the data is sent via the transmission medium 230 from each separate receiver 102*a-c*, 103*a-c*, 104*a-c* to an analyzer 240. The data may be aggregated and sent all at once to the analyzer 240, or data may be sent to the analyzer 240 as the data becomes available. In a subsequent step 340, the analyzer 240 sums the signals represented by the data received each of the separate receivers 102*a-c*, 103*a-c*, 104*a-c*. The analyzer 240 may wait until it has received data from all of the separate receivers 102*a-c*, 103*a-c*, 104*a-c* before summing the signals, or the analyzer 240 may begin summing signals as soon as the analyzer 240 receives data from two or more separate receivers 102*a-c*, 103*a-c*, 104*a-c*. The process of summing two or more signals is a process well known in the art. Any conventional or future-developed method of summing the signals may be employed. For example, the analyzer 240 may utilize a computer program configured to sum the signals represented by the data by adding the signals, perhaps after appropriate correlation and shifting.

The analyzer 240 may also cancel noise present within the data in a step 350. One or more of the processors 220 may introduce significant noise into the resulting digital data during the analog to digital conversion process. The noise introduced by the processor(s) 220 is random in nature relative to the subterranean activity and, thus may be identified and canceled by an analyzer 240. Cancellation of noise introduced by the one or more processors 220 may be improved by configuring each sensor 210*a-c* with a processor 220 and digitizing the data received by each sensor separately. Digital signal conditioning prior to summing signals represented by the data may also help cancel noise.

The analyzer 240 may also potentially cancel cultural noise and other external noise, such as ringing which can potentially occur from a variety of sources including mechanical resonances of the borehole sensor package. The ability of an analyzer 240 to cancel cultural noise may depend on the source of the cultural noise. For example, in a vertically-aligned stacked receiver array 100, a noise source from a pump in an adjacent well may appear essentially the same to each separate receiver 102a-c, 103a-c, 104a-c of a stacked node 102-104. However, gas bubbles migrating upward through fluid and hitting a separate receiver 102a-c, 103a-c, 104a-c in a vertically-aligned stacked receiver array 100 would appear differently to the sensors 210a-c of other separate receivers 102a-c, 103a-c, 104a-c of the same stacked node 102-104. Thus, the gas bubbles would essentially appear to be random to each separate receiver 102a-c, 103a-c, 104a-c of a stacked node 102-104. Another example of random noise is from the electronics of the signal digitizing system.

After the analyzer 240 sums the signals represented by the data and cancels noise present in the data, the signal representing subterranean activity becomes more apparent, because noise is reduced relative to the signal, and it is possible to more accurately pick wave arrivals and examine polarization characteristics of the waves. In an optional step 360, the analyzer 240 may correlate summed data with data from adjacent unstacked nodes 110-118. For example, if the signals resulting from analysis of the stacked nodes 102-104 are sufficiently improved, the data received from the stacked nodes 102-104 can be used as "master events" to aid in the processing of adjacent levels through correlation or other approaches. Consequently, data received from the stacked nodes 102-104 may be of better quality relative to the data received from the unstacked nodes 110-118, and may provide overall improvement in the detection of arrivals throughout the stacked receiver array 100. The stacked node approach may be used to obtain enhanced microseismic maps through (a) improving the data quality of low-amplitude events and (b) extracting data from events, such as small events, that might not be analyzable without this stacking.

Although the present disclosure has described embodiments relating to oil and gas environments, it is understood that the apparatus, systems and methods described herein could applied to other environments, such as telecommunications, electricity, or any environment utilizing receiver arrays.

Any spatial references such as, for example, "upper," "lower," "above," "below," "between," "vertical," "horizontal," "angular," "upward," "downward," "side-to-side," "left-to-right," "right-to-left," "top-to-bottom," "bottom-to-top," "left," "right," etc., are for the purpose of illustration only and do not limit the specific orientation or location of the structure described above.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

In view of all of the above, it should be readily apparent that the present disclosure introduces a stacked node configured to be positioned within a subterranean opening and comprising a plurality of separate receivers oriented end-to-end and each configured to independently detect subterranean activity; and a transmission medium configured to transmit data from the stacked node, wherein the data is representative of subterranean activity detected by the plurality of separate receivers.

The apparatus may further comprise a plurality of additional receivers each positioned axially offset from the plurality of separate receivers of the stacked node and each configured to independently detect subterranean activity. The transmission medium may comprise fiber optic cable. The transmission medium may also comprise a plurality of fiber optic cables each configured to transmit digital data from a corresponding one of the plurality of separate receivers of the stacked node. The data transmitted via the transmission medium may be digital data, and the stacked node may further comprise at least one processor configured to convert analog data representative of detected subterranean activity into the digital data. Each of the plurality of separate receivers in the stacked node may be substantially similar. The subterranean activity may be seismic activity.

The present disclosure also introduces a method, comprising positioning a stacked node within a subterranean opening, wherein the stacked node comprises a plurality of separate receivers oriented end-to-end and each configured to independently detect subterranean activity, detecting subterranean activity via each of the plurality of separate receivers, converting analog data representative of the detected subterranean activity into digital subterranean activity data, and transmitting the digital subterranean activity data to an analyzer. Transmitting the digital subterranean activity data may comprise transmitting the digital subterranean activity data via a fiber optic cable. Transmitting the digital subterranean activity data may also comprise transmitting the digital subterranean activity data via a plurality of fiber optic cables each configured to transmit digital subterranean activity data from a corresponding one of the plurality of separate receivers of the stacked node. Each of the plurality of separate receivers in the stacked node may be substantially similar. The method may further comprise summing the transmitted digital subterranean activity data transmitted to the analyzer from each of the plurality of separate receivers of the stacked node. The method may also further comprise positioning each of a plurality of additional receivers axially offset from the plurality of separate receivers, wherein each of the plurality of additional receivers is configured to independently detect subterranean activity. Furthermore, the method may further comprise summing the transmitted digital subterranean activity data transmitted to the analyzer from each of the plurality of separate receivers of the stacked node and each of the plurality of additional receivers. The subterranean activity may be seismic activity.

The present disclosure also provides a system comprising a stacked node configured to be positioned within a subterranean opening and comprising a plurality of separate receivers oriented end-to-end and each configured to independently detect subterranean activity, a processor configured to convert analog data representative of subterranean activity detected by the plurality of separate receivers into digital data, an analyzer configured to receive the digital data, and a transmission medium configured to the digital data from the stacked node to the analyzer. The system may further comprise a plurality of additional receivers each positioned axially offset from the plurality of separate receivers of the stacked node and each configured to independently detect subterranean activity. The transmission medium may comprise fiber optic cable. The transmission medium may also comprise a plurality of fiber optic cables each configured to transmit digital data from a corresponding one of the plurality of separate receivers of the stacked node to the analyzer. Each of the plurality of separate receivers in the stacked node may be substantially similar.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An apparatus, comprising:
a stacked node configured to be positioned within a subterranean opening and comprising a plurality of separate receivers located within ten feet of each of the plurality of separate receivers, and said each of the plurality of separate receivers configured to independently detect subterranean activity, wherein said each of the plurality of separate receivers comprises a plurality of sensors for collecting seismic data and a processor configured to digitize the seismic data collected by the sensors;
a fiber optic cable configured to transmit signals represented by the digitized seismic data from the stacked node; and
an analyzer configured to sum the signals from said each of the plurality of separate receivers of the stacked node to produce summed data, and cancel random noise in the digitized seismic data, wherein the analyzer is further configured to correlate the summed data with data received from an adjacent unstacked node, and wherein the analyzer is further configured to cancel cultural and other external noise in the transmitted signals represented by the digitized seismic data from said each of the plurality of separate receivers of the stacked node;
wherein the apparatus further comprising canceling processor noise present in the transmitted signals represented by the digitized seismic data, the processor noise having been introduced into the digitized seismic data by the processor, wherein the canceling of the processor noise comprises identifying the processor noise as noise which is random in nature relative to the detected subterranean activity.

2. The apparatus of claim 1 further comprising a plurality of additional receivers, wherein each of the plurality of additional receivers positioned axially offset from the plurality of separate receivers of the stacked node and said each of the plurality of additional receivers configured to independently detect additional subterranean activity.

3. The apparatus of claim 1 further comprising a plurality of fiber optic cables, wherein each of the plurality of fiber optic cables configured to transmit the signals represented by the digitized seismic data from a corresponding one of the plurality of separate receivers of the stacked node.

4. The apparatus of claim 1 wherein said each of the plurality of separate receivers in the stacked node is substantially similar.

5. The apparatus of claim 1 wherein the subterranean activity is a seismic activity.

6. The apparatus of claim 1 wherein the processor is configured to convert analog data representative of the detected subterranean activity into digital subterranean activity data, and to transmit the digital subterranean activity data via the fiber optic cable.

7. A method comprising:
positioning a stacked node within a subterranean opening, wherein the stacked node comprises a plurality of separate receivers located within ten feet of each of the plurality of separate receivers, and said each of the plurality of separate receivers configured to independently detect subterranean activity, wherein said each of the plurality of separate receivers comprises a plurality of sensors;
said detecting the subterranean activity via the plurality of sensors of said each of the plurality of separate receivers to produce subterranean activity data representative of the subterranean activity detected by said each of the plurality of separate receivers;
converting analog data representative of the subterranean activity into corresponding digital subterranean activity data for said each of the plurality of separate receivers;
transmitting the digital subterranean activity data for said each of the plurality of separate receivers via signals represented by the digital subterranean activity data to an analyzer via a fiber optic cable;
summing by the analyzer the signals from said each of the plurality of separate receivers of the stacked node to produce summed data, wherein the analyzer is further configured to correlate the summed data with data received from an adjacent unstacked node, and wherein the analyzer is further configured to cancel cultural and other external noise in the transmitted digital subterranean activity data from said each of the plurality of separate receivers of the stacked node; and
cancelling random noise from the transmitted digital subterranean activity data, and canceling processor noise present in the transmitted digital subterranean activity data, the processor noise having been introduced into the digital subterranean activity data by a processor, wherein the canceling of the processor noise comprises identifying the processor noise as noise which is random in nature relative to the detected subterranean activity.

8. The method of claim 7 wherein transmitting the digital subterranean activity data comprises transmitting the digital subterranean activity data via a plurality of fiber optic cables, wherein each of the plurality of fiber optic cables configured to transmit the digital subterranean activity data from a corresponding one of the plurality of separate receivers of the stacked node.

9. The method of claim 7 wherein said each of the plurality of separate receivers in the stacked node is substantially similar.

10. The method of claim 7, wherein the summing of the signals represented by the digital subterranean activity data comprises positioning each of a plurality of additional receivers axially offset from the plurality of separate receivers, wherein said each of the plurality of additional receivers is configured to independently detect additional subterranean activity.

11. The method of claim 10, wherein the summing of the signals represented by the digital subterranean activity data further comprises summing the signals represented by the digital subterranean activity data transmitted to the analyzer from said each of the plurality of separate receivers of the stacked node and said each of the plurality of additional receivers.

12. The method of claim 7 wherein the subterranean activity is seismic activity.

13. A system, comprising:
   a stacked node configured to be positioned within a subterranean opening and comprising a plurality of separate receivers located within ten feet of each of the plurality of separate receivers, wherein said each of the plurality of separate receivers comprises a plurality sensors for detecting subterranean activity, to provide subterranean activity data;
   a processor configured to convert analog data representative of the detected subterranean activity by the plurality of separate receivers into digital data represented by digital subterranean activity data for said each of the plurality of separate receivers;
   an analyzer configured to produce summed data by receiving and summing signals represented by the digital data from said each of the plurality of separate receivers of the stacked node, wherein the analyzer is further configured to cancel random noise from the digital data, wherein the analyzer is further configured to correlate the summed data with data received from an adjacent unstacked node, and wherein the analyzer is further configured to cancel cultural and other external noise in the digital data from said each of the plurality of separate receivers of the stacked node; and
   a fiber optic cable configured to transmit from the stacked node to the analyzer the signals represented by the digital subterranean activity data from said each of the plurality of separate receivers, wherein the system further comprising canceling processor noise present in the digital data, the processor noise having been introduced into the digital data by the processor, wherein the canceling of the processor noise comprises identifying the processor noise as noise which is random in nature relative to the detected subterranean activity.

14. The system of claim 13 further comprising a plurality of additional receivers, wherein each of the plurality of additional receivers positioned axially offset from the plurality of separate receivers of the stacked node and said each of the plurality of additional receivers configured to independently detect an additional subterranean activity.

* * * * *